United States Patent [19]
Bogard

[11] Patent Number: 5,988,690
[45] Date of Patent: Nov. 23, 1999

[54] DEVICE FOR CONNECTING TUBE TO ENDPIECE

[75] Inventor: Olivier Bogard, Rennes, France

[73] Assignee: Legris S.A., Rennes, France

[21] Appl. No.: 09/051,631

[22] PCT Filed: Oct. 21, 1996

[86] PCT No.: PCT/FR96/01641

§ 371 Date: Apr. 16, 1998

§ 102(e) Date: Apr. 16, 1998

[87] PCT Pub. No.: WO97/15777

PCT Pub. Date: May 1, 1997

[30] Foreign Application Priority Data

Oct. 27, 1995 [FR] France .................................. 95 12702

[51] Int. Cl.[6] .................................................. F16L 35/00
[52] U.S. Cl. ........................... 285/24; 285/111; 285/330; 285/331; 285/340; 285/353; 285/906
[58] Field of Search ............................. 285/24, 27, 340, 285/331, 330, 111, 353, 906

[56] References Cited

U.S. PATENT DOCUMENTS

| | | |
|---|---|---|
| 2,555,591 | 6/1951 | Kane, Jr. . |
| 4,463,972 | 8/1984 | Weinhold ............................. 285/331 X |
| 4,772,558 | 9/1988 | Badoureaux ......................... 285/340 X |
| 4,842,548 | 6/1989 | Bolante . |
| 4,958,858 | 9/1990 | Guest ........................................ 285/24 |
| 5,286,067 | 2/1994 | Choksi ................................. 285/331 X |

FOREIGN PATENT DOCUMENTS

| | | |
|---|---|---|
| 550323 | 7/1993 | European Pat. Off. ................ 285/340 |
| 2452050 | 10/1980 | France . |
| 828174 | 2/1960 | United Kingdom . |
| 2210123 | 6/1989 | United Kingdom . |

Primary Examiner—Dave W. Arola
Attorney, Agent, or Firm—Griffin, Butler, Whisenhunt & Szipl, LLP

[57] ABSTRACT

A junction device for joining a tube (3) to the body of a part (2) including a cylindrical endpiece (1) belonging to the part and defining a end face (6), and a coupling sleeve (11) having a first section (12) including releasable fastener means (13) for co-operating with corresponding means (5) on the coupling endpiece (1) and having a second section (14) axially adjacent to the first section (12) and including means (15) for opposing extraction of an end of the tube (3) placed in the sleeve (11) and in abutment against the end face (6) of the endpiece (1), in which the sleeve (11) is internally fitted with a guide ring (19) for guiding the end of the tube (3), the inside diameter (D) of the ring being substantially equal to the outside diameter of the tube (3), the ring possessing a first portion (20) mounted to slide in the second section (14) of the sleeve (11) and a second portion (21) projecting axially into the first section (12) of the sleeve (11), and the endpiece (1) being provided with a groove (7) formed in its end face (6) to receive and center the free end of the projecting second portion (31) of the ring (19) when the fastener means (5, 13) are in engagement.

9 Claims, 2 Drawing Sheets

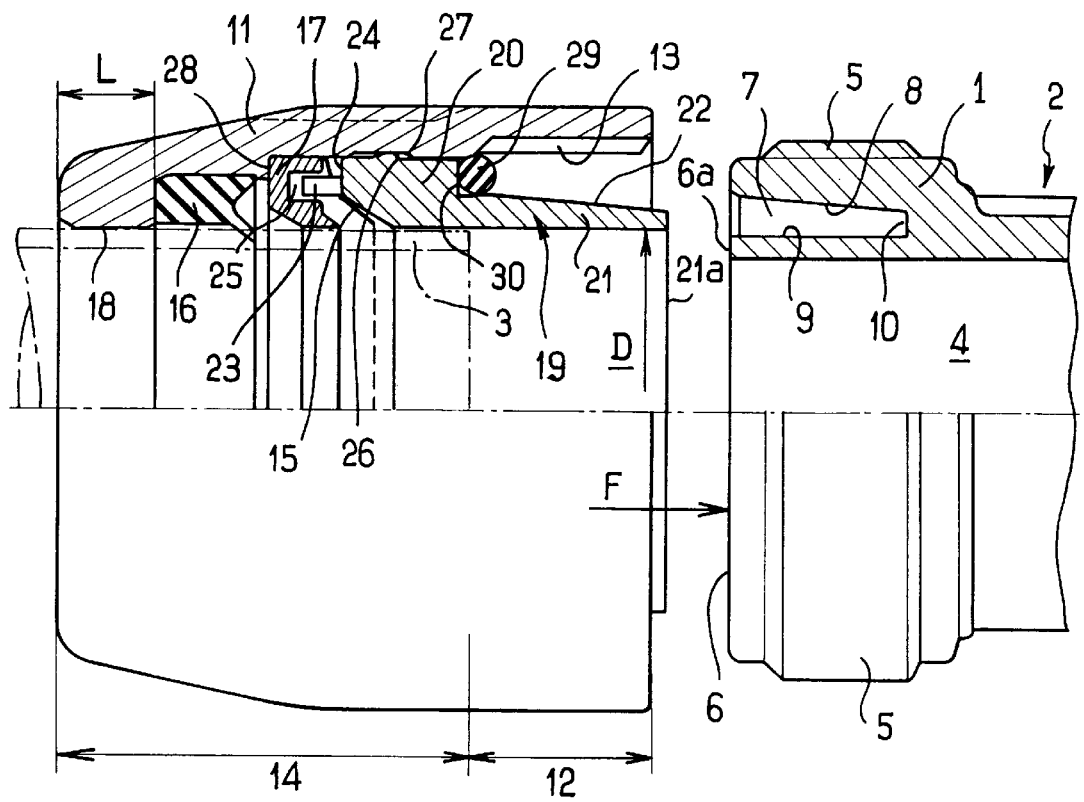
FIG_1
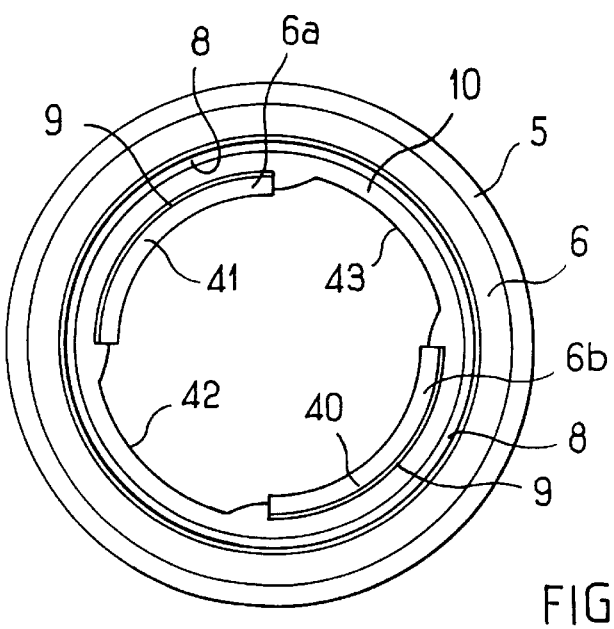
FIG_2

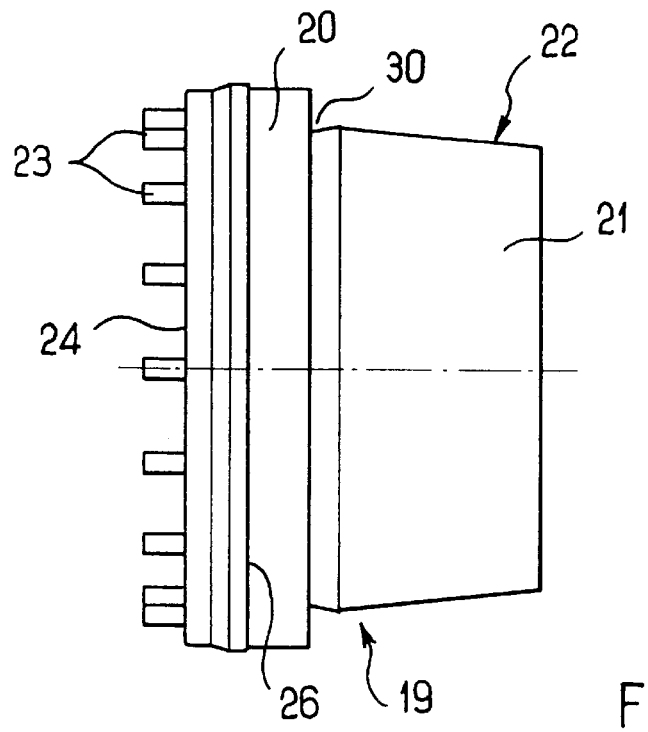
FIG_3
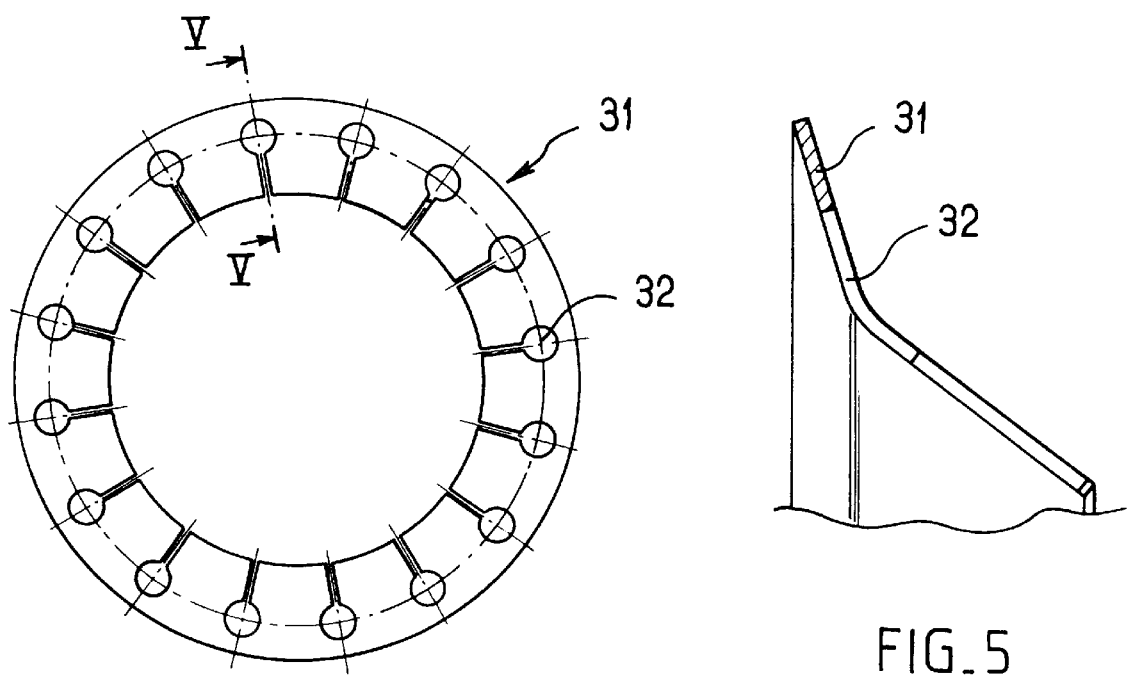
FIG_4
FIG_5

DEVICE FOR CONNECTING TUBE TO ENDPIECE

The present invention relates to a device for connecting a length of pipe and a functional component or for coupling with an installation containing fluid under pressure, the device enabling a fluid distribution network to be built up in a manner that is simple, quick, rational and extendable or configurable as a function of changes in the needs of the user.

BACKGROUND OF THE INVENTION

At present, in a factory, a network for distributing a fluid, e.g. compressed air, is made essentially by plumbing, i.e. the pipes forming the network are put into place by hand (piping is cut to length, lengths are shaped on site as a function of local geometrical constraints, and coupling elements or branch connection elements are brazed, soldered, or glued to the lengths of piping). In some cases, use is also made of devices for coupling together lengths of tube by means of claws, as illustrated in document GB 2 117 072 which enables a certain amount of time to be saved. Modifying or extending an installation of that type requires the entire installation to be revised in order to add or remove such and such a branch connection. Even for small changes of the installation, e.g. increasing the diameter of a branch because of an increase in power demand on that line, it is necessary to undertake major work that keeps the installation out of operation for a long time.

The drawbacks of present installations and of their laying techniques can be remedied with connection means that enable a new installation to be assembled extremely quickly with the possibility of modifying easily its configuration, and the nature or the location of the functional elements that make it up.

Such connection means enable the pipe(s) making up the installation or the network to be subdivided into modular elements or lengths which are easily replaced or altered, said lengths being provided in a series of predetermined sizes and including no special end means for connection to the installation. The connection means are concentrated in a special element that is interposed between the end of a length and a functional member, which functional member comprises a rigid tubular body and may be no more than a union or a plug.

The term "endpiece" is used below to designate any cylindrical end of a rigid body provided internally with a fluid circulation channel and externally with coupling means (thread, collar, radial studs, camming elements, . . . ) for co-operating with corresponding coupling means of a tube coupling ring. The end is defined axially by a surface constituting an abutment for the tube to be connected.

To satisfy the needs for quick and easily modifiable connection, the means for connecting a tube to an endpiece are in the form of a cylindrical sleeve having an axial section which possesses means for fixing it to the endpiece and another axial section possessing retention means, e.g. claw connection means. In such a device, the tube does not penetrate into the endpiece, thereby enabling the link to be dismounted without it being necessary to extract the tube from the endpiece by an axial movement. It is thus possible to make networks of pipes using mutually adjacent lengths of tube with link pieces interposed between adjacent lengths (each link piece possessing an endpiece for each adjacent length). In addition to providing a link, this piece can perform other functions such as providing a branch connection, a cutoff function, a fluid pressure expansion function, purging, . . . When the layout of the network is to be changed using this type of connection, it is possible to extract at least one length of tube from the network laterally, i.e. without any need to perform an axial disengagement movement between the length of tube and the link pieces. Such axial movement would require the pieces to be dismounted to release them from the structure that carries them, since the network is generally fixed to said structure by said pieces.

This absence of axial engagement between the link pieces and the lengths of tube where they are connected together gives rise to points of mechanical weakness that are poor at withstanding the bending stresses to which the network can be subject, e.g. as a result of buckling forces due to the lengths of tube expanding. As a result, at the location of the link, the tube becomes ovalized and decentered, thereby harming the quality of the connection and of sealing at the connection.

OBJECT AND SUMMARY OF THE INVENTION

The present invention seeks to mitigate that drawback by means specific to this type of connection for reinforcing mechanical linkage between the endpiece and the tube without interfering with the laterally-releasable nature of this link.

To this end, the invention provides a junction device for joining a tube to the body of a part including a cylindrical endpiece belonging to the part and defining a end face, and a coupling sleeve having a first section including releasable fastener means for co-operating with corresponding means on the coupling endpiece and having a second section axially adjacent to the first section, and including means for opposing extraction of an end of the tube placed in the sleeve and in abutment against the end face of the endpiece. More precisely, the sleeve is internally fitted with a guide ring for guiding the end of the tube, the inside diameter of the ring being substantially equal to the outside diameter of the tube, the ring possessing a first portion mounted to slide in the second section of the sleeve and a second portion projecting axially into the first section of the sleeve, and the endpiece being provided with a groove formed in its end face to receive and center the free end of the projecting second portion of the ring when the fastener means are in engagement.

Thus, when the fixing means are in engagement, the ring in question constitutes a kind of box holding the periphery of the end of the tube as would be done by a housing formed in the endpiece with said end penetrating therein. The advantage of the ring is that it is separable from the endpiece when the fixing means are being uncoupled, thereby retaining the laterally-releasable nature of the link.

To improve the behavior of the ring with respect to the tube, i.e. to make it equivalent to a reception housing that the endpiece could include, the sleeve possesses a shoulder forming an abutment for engaging and holding the free end of the guide ring in the groove formed in the end face of the endpiece, and said groove is axially defined by a bottom forming a bearing surface for the free end of the ring when the fixing means are fully engaged. Under such conditions, there remains no degree of freedom between the ring and the endpiece, such that the ring behaves almost like an integral extension of the endpiece with the end of the tube being engaged therein.

In a preferred embodiment, the side surfaces of the groove are conical and converging, whereas the outer side surface of the free end of the ring is conical, having an angle at the apex that is smaller than the angle at the apex of the outer side surface of the groove. The ring is thus fixed to the endpiece when the fixing means are engaged, but without any jamming, thereby making it possible when the fixing means are uncoupled to extract the ring from the groove simply and without applying force.

In a variant embodiment, the inside wall of the groove possesses at least two recesses thus defining at least two tongues between them. There is no need for the inside wall of the groove to be continuous. It may be constituted by two or more tongues which constitute means for guiding and centering the free end of the ring and whose own free ends are situated level with the end face of the endpiece and constitute the abutment against axial engagement of the tube in the junction device of the invention.

To enable the ring to be extracted from the groove formed in the endpiece when the junction device is being dismantled, the ring and the sleeve possess abutment means directed away from the shoulder of the sleeve to limit relative sliding thereof away from the shoulder and to keep the ring captive relative to the sleeve.

To increase the axial engagement of the end of the tube in the junction device of the invention, the inlet orifice of the sleeve has an inside diameter substantially equal to the outside diameter of the tube and forms a bearing surface for guiding the tube and of axial length such that the length of the second section of sleeve is at least equal to the outside diameter of the sleeve.

Since the tube retaining means are themselves formed in conventional manner by a conical washer having inwardly-directed radial teeth, with the outside portion of said washer being clamped between the ring and the shoulder of the sleeve, the washer includes screw orifices for end projections on the ring extending towards the shoulder so that when the fixing means are fully engaged, there exists clearance between the shoulder and the ring that is greater than the thickness of said outside portion of the conical washer.

BRIEF DESCRIPTION OF THE DRAWINGS

Other characteristics and advantages of the invention appear from the description of an embodiment thereto given below by way of non-limiting example. Reference is made to the accompanying drawings, in which:

FIG. 1 is a view partially in section of a junction device of the invention;

FIG. 2 is an end view of the cylindrical endpiece to which the tube is to be connected;

FIG. 3 is an outside view of the ring used in the device of the invention; and

FIGS. 4 and 5 are detailed views of the claw washer for holding the tube in the sleeve of the invention.

MORE DETAILED DESCRIPTION

FIG. 1 shows an endpiece 1 of a part 2 to which it is desired to connect the end of a tube 3. The endpiece defines a central channel 4 and is provided externally with a thread 5. It is terminated by an end surface 6 in which a groove 7 is formed, defined by an outer side surface 8, an inner side surface 9, and a bottom 10. The outer side surface 8 is conical and converges away from the end surface 6 and the inner side surface 9 is also conical, but of much smaller slope, and diverging away from the end surface 6.

The device of the invention shown in FIG. 1 also includes a coupling sleeve 11 having a first section 12 with inside tapping 13 suitable for screwing onto the outside thread 5 of the endpiece 1, and a second section 14 adjacent to the first section 12 and housing not only means for opposing extraction of the tube 3 received in the sleeve 11 and constituted in this case by a washer 15 that is described in greater detail with reference to FIGS. 4 and 5, but also sealing means constituted by a gasket 16. A spacer 17 is disposed between the washer 15 and the gasket 16 to constitute a bearing surface for said washer against which it is pressed by resilient deformation when the threaded fastener means 5 and 13 are fully engaged. The free end of the axial section 14 of the sleeve defines an opening 18 of axial length marked L in FIG. 1.

Beyond the washer 15, going away from the inlet 18, the sleeve includes a guide ring 19 for the tube 3. The ring 19 has a first portion 20 in the vicinity of the washer 15 and mounted to slide in the second section 14 of the sleeve 11. The ring has a second portion 21 extending the first portion 20 to project into the first section 12 of the sleeve 11. The second portion 21 is defined by a conical outer surface 22 converging to the right of the drawing and of a slope that is slightly shallower than the slope of the conical surface 8 constituting the outer side surface of the groove 7.

At its end remote from the projection 21, the ring 19 has a series of axial fingers 23 which extend towards the spacer 17 from an end surface 24 and which penetrates freely into corresponding housings 25 provided in the spacer 17 and recessed in the bearing surface of said spacer for engaging the washer 15.

The portion 20 also includes a peripheral shoulder 26 facing away from the surface 24 to co-operate with a corresponding shoulder 27 formed in the second section 14 of the sleeve, with the shoulder 27 being slightly conical in this case. The ring 19 can thus slide axially in limited manner inside the sleeve 11 between the position shown in FIG. 1 where the shoulders 26 and 27 are in mutual contact and a position in which the fingers 23 are in abutment against the bottoms of the housings 25 in the spacer 17, with the spacer 17 then being pressed against a shoulder 28 of the sleeve.

Finally, it will be observed that an O-ring gasket 29 is placed at the junction between the portions 20 and 21 of the ring 19, and on the outside thereof, said gasket 29 being held on the ring by a conical surface 30 constituting a housing therefore.

The ring 19 has an inside diameter D substantially equal to the outside diameter of the tube 3. The largest diameter of the inner side surface 9 of the groove 7 is slightly smaller than the inside diameter D of the ring 19. Also, the outside diameter of the portion 21 measured in the plane of its end surface 21a is substantially equal to the diameter of the conical outside surface 8 of the groove 7 measured in the plane of its bottom 10.

When it is desired to connect the tube 3 to the part 2, the sleeve fitted with the above-described element is initially screwed to the endpiece 1. The portion 21 of the ring 19 thus penetrates into the groove 7 and is centered relative thereto by the conical wall 8 of the groove. When the face 21a of the ring 19 meets the bottom 10 of the groove 7, further tightening moves the bottoms of the housings 25 towards the fingers 23 until they finally press thereagainst. The ring 19 is then locked in a position which is determined by the way its portion 21 is guided in the groove 7 and by its front surface 21a pressing against the bottom 10 of the groove. The clearances between the ring 19 and the sleeve 11 are such that said guidance and said pressing predominate in the final position taken up by the ring 19. The ring thus acts as an integral extension of the endpiece 1 since its position is defined by said endpiece.

At the end of tightening, the end face 6 of the endpiece outside the groove 7 has served to compress slightly the gasket 29 and it is situated in part inside the ring 19. This is inside portion constitutes the abutment for the tube 3 that is inserted into the sleeve after the sleeve has been screwed to the endpiece. Since the inside bearing surface of the ring 19 extends over the axial length of the projecting portion 21 and over at least a fraction of the axial length of the portion 20, the portion 20 constitutes a bearing surface that centers the tube 3, thereby ensuring that it is properly positioned and behaves substantially like a beam having its end fixed relative to the endpiece 1.

While the sleeve is being tightened to the endpiece, the stack 17, 19 is being compressed and it constrains the washer 15 to take up a position that is more radial than its rest position. This conventional type of deformation enables the inwardly-directed teeth of the washer 15 to extend over a diameter that is slightly smaller than the outside diameter of the tube 3. FIG. 4 shows a plane blank from which the washer 15 can be made, the blank possessing a plurality of orifices 32 of diameter and disposition such that, when the washer is shaped as shown by the section of FIG. 5, the orifices 32 allow the fingers 23 of the ring 19 to pass through them with clearance. When the ends of the fingers press against the bottoms of the housings 25 in the spacer 17, the surface 24 of the ring 19 does not clamp firmly against the washer 25 causing it to press against the spacer 17. On the contrary, a gap remains between the spacer 17 and the surface 24 which is greater than the thickness of the washer 15 so a small amount of clearance remains for the washer, which clearance facilitates insertion of the tube 3.

FIG. 2 is a view seen along arrow F, i.e. it is an end view of the part 2, and it shows that the inside of the groove 7 is not defined by a continuous wall but by two tongues 40 and 41 carrying portions of the surface 9, said tongues being separated by recesses 42 and 43 that are completely empty of material. It is the end surfaces 6a and 6b of these tongues that constitute the abutment against insertion of the tube 3, these end surfaces 6a and 6b lying in the end plane 6 of the endpiece 1.

Finally, according to the invention, the inlet portion of the sleeve 11 which defines the opening 18 through which the tube 3 is inserted is of an axial length L such that the axial length of the second section 14, i.e. the distance between the end 6 of the endpiece 1 received in the sleeve 11 after tightening has been completed, and the free end of the sleeve is greater than the diameter D of the tube. This improves the embedding of the tube in the junction device, thus opposing deformation to which the tube could be subjected because of bending and buckling stresses that may be applied thereto. The bearing surface 18 at the inlet of the sleeve may be subdivided into a multitude of sections that are separated by axial grooves.

Naturally, the invention can be embodied differently. In particular, the spacer 17 need not be present, in which case the fingers 23 press directly against the shoulder 28 with the washer 15 being between them.

I claim:

1. A junction device for joining a tube (3) to the body of a part (2) including a cylindrical endpiece (1) and having an end face (6), said device having a coupling sleeve (11) with a first section (12) including releasable fastener means (13) for co-operating with corresponding means (5) on the coupling endpiece (1) and with a second section (14) axially adjacent to the first section (12) and including means (15) for gripping an end of the tube (3) placed in the sleeve (11) and in abutment against the end face (6) of the endpiece (1) when said first section is fastened to said coupling endpiece, wherein the sleeve (11) is internally fitted with a guide ring (19) for guiding the end of the tube (3), the inside diameter (D) of the ring being substantially equal to the outside diameter of the tube (3), the ring possessing a first portion (20) mounted to slide in the second section (14) of the sleeve (11) and a second portion (21) projecting axially into the first section (12) of the sleeve (11), and wherein the endpiece (1) is provided with a groove (7) formed in said end face (6) to receive and center the free end of the projecting second portion (2) of the ring (19) when the fastener means (5, 12) are in engagement.

2. A device according to claim 1, wherein the sleeve (11) possesses a shoulder (28) forming at least indirectly an abutment for limiting the sliding movement of the guide ring (19) towards said second section of said sleeve.

3. A device according to claim 2, wherein the ring (19) and the sleeve (11) possess abutment means (26, 27) remote from the shoulder (28) of the sleeve to limit relative sliding therebetween away from the shoulder (28), thereby causing the ring (19) to be held captive relative to the sleeve.

4. A device according to claim 2, wherein said gripping means include a conical washer (15) possessing inside radial teeth and an outside portion, the outside portion of the washer being clamped at least indirectly between the ring (19) and the shoulder (28) of the sleeve, said ring having projections extending towards said shoulder and the washer (15) including orifices (31) for said projections (23) such that when the fastener means (5, 13) are fully engaged, the distance between said ring and said shoulder is greater than the thickness of the conical washer (15).

5. A device according to claim 1, wherein the groove (7) has a bottom (10) forming a bearing surface for the free end (21a) of the ring (19) when the fastener means (5, 13) are fully engaged.

6. A device according to claim 1, wherein the groove (7) has outer and inner lateral surfaces (8, 9) converging towards said bottom.

7. A device according to claim 6, wherein the second portion (21) of the ring (19) has an outer side surface which is frusto conical having an angle at the apex that is smaller than the angle at the apex of the outer side surface (8) of the groove (7).

8. A device according to claim 4, wherein the inner lateral wall (9) of the groove possesses at least two recesses (42, 43) and at least two tongues (40, 41) therebetween.

9. A device according to claim 1, wherein said second section of the sleeve has an inlet orifice (18) with an inside diameter (D) substantially equal to the outside diameter of the tube (3) and forming a guiding bearing surface for the tube (3) over an axial length (L) that is such that the length of the second section (14) of the sleeve (11) is not less than the outside diameter (D) of the tube.

* * * * *